Nov. 7, 1939.  G. G. RAYMOND ET AL  2,178,646
PALLET
Filed Sept. 18, 1937
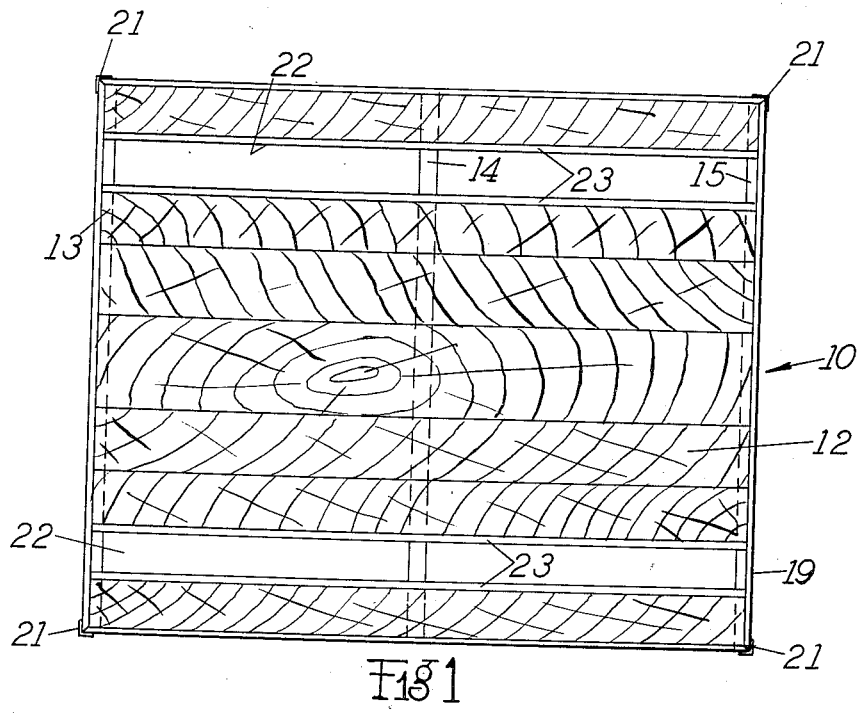
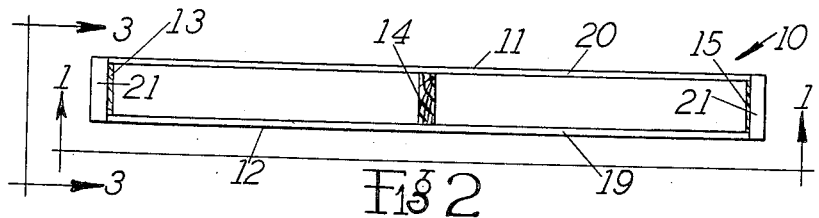
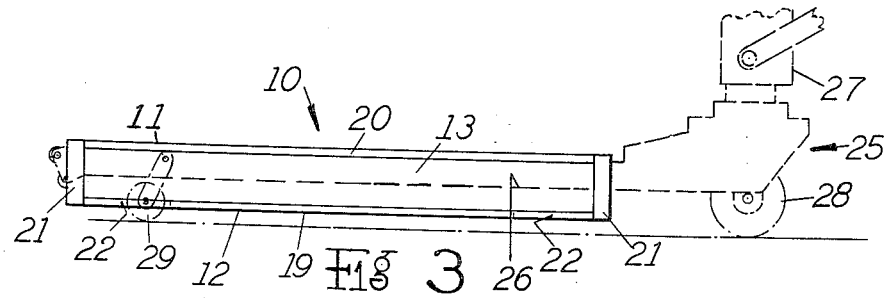
INVENTORS
GEORGE G. RAYMOND
& WILLIAM C. HOUSE
BY
ATTORNEY.

Patented Nov. 7, 1939

2,178,646

UNITED STATES PATENT OFFICE 2,178,646

PALLET

George G. Raymond and William C. House, Greene, N. Y., assignors to Lyon Iron Works, a corporation of New York Application September 18, 1937, Serial No. 164,541

6 Claims. (Cl. 248—120)

This invention relates to pallets and more particularly to that type of pallet known in the art as a two faced pallet.

One object of this invention is the provision of a pallet of the type to be hereinafter described which will be simple and relatively inexpensive to manufacture and sturdy and durable in construction, to enable the same to withstand the severe wear and rough usage incident to the use thereof.

An additional object is the provision of a pallet designed to cooperate in a unique manner with a lift truck.

A further and more specific object is the provision of such a pallet particularly adapted for use with the type of hand lift truck disclosed in applicants' co-pending application, Serial No. 164,540, filed of even date herewith.

An additional object is the provision of a pallet combining the various advantages of a single faced pallet and a double faced pallet.

Another object is the provision of a unique reenforced double faced pallet.

Still another object is the provision of a reenforced pallet wherein the said reenforcement serves also as a means for securing the parts of the pallet in assembled relation.

A further and more specific object is the provision of a reenforced pallet provided with apertures in one face thereof to permit the passage of suitable supports associated with a lift truck therethrough.

A still further and more specific object is the provision of reenforcing means adjacent such apertures to prevent breakage of the edges thereof through contact with said supports.

As conducive to a clearer understanding of this invention it may here be pointed out that pallets are extensively used in the storage and handling of various types of goods and more specifically those types comprised of a plurality of small articles whereby a quantity of such small articles may be stacked upon a pallet and moved or handled as relatively large integral unit. Lift trucks of various types are utilized in handling such loaded pallets and it frequently occurs that it is desirable to place a loaded pallet on top of another pallet carrying a similar load of relatively small articles in order to conserve storage space. In such cases it is desirable that the pallet be comprised of two surfaces spaced apart as by spacer beams in order that the upper surface may present a relatively large supporting unit for the load carried by the pallet and the lower surface may present a relatively large surface to support the weight thereof upon such a stack or pile of small articles, in such a manner as to prevent localization of the weight on the supporting beams and hence possible disruption of the stacked articles. A two faced pallet however has the disadvantage that only certain types of lift trucks may be used therewith, namely those trucks having a lifting member or fork of a type designed to be inserted between the two faces of the pallet. Prior to the invention of applicants' lift truck disclosed in the above mentioned co-pending application lift trucks adapted for use with double faced pallets were, of necessity, cumbersome and heavily counterweighted, since counterweighting has hitherto been the only suitable method of supporting a load on such members as were adapted to be inserted between the two faces of the pallet. It is an object of this invention, therefore, to provide in one pallet the combined advantages of both the single and double faced types, that is, a pallet which may be readily utilized with an uncounterweighted hand lift truck of the type disclosed in the applicants' above mentioned co-pending application and yet which will provide, in effect, a large lower surface to permit placing thereof on top of a stack of small articles.

Other objects will in part be obvious and in part be pointed out hereinafter.

The invention accordingly resides in the combinations of elements, arrangements of parts and features of construction all as will be more fully pointed out hereinafter and disclosed in the accompanying drawing wherein:

Figure 1 is a bottom plan view of a pallet embodying the features of the instant invention as viewed substantially along the line 1—1 of Figure 2, Figure 2 is an elevation of the structure shown in Figure 1 as viewed from the top, and Figure 3 is a side elevational view of the structure shown in Figures 1 and 2 as viewed substantially along the line 3—3 of Figure 2, a suitable lift truck for use therewith being disclosed in dotted lines.

Similar reference characters refer to similar parts throughout the several views of the drawing.

Referring now specifically to the drawing the pallet comprising the instant invention is generally indicated at 10.

Pallet 10 is comprised of a top surface 11 spaced from a lower surface 12 as by a plurality of spacer beams 13, 14 and 15, which extent longitudinally from end to end of the pallet. Any desired number of such spacer beams may be utilized but it is preferable to provide a single central beam in order that the device may be centered upon a lift truck, the central beam passing between the extending members or fork of such a lift truck. The pallet may also be of any desired dimensions. It being preferable however that the spacer beams be of sufficient thickness to provide ample clearance between faces 11 and 12 to permit the insertion of the extending portion of a lift truck.

The pallet may be constructed of wood or other suitable material and is preferably reenforced by angle irons 19 extending completely about the peripheral edge of the lower face and similar angle irons 20 extending completely about the peripheral edge of the upper face. Additional reenforcements may take the form of vertically disposed angle irons 21 positioned at each corner of the pallet.

Angle irons 21 may be secured in any desired manner, as by welding to angle irons 19 and 20 to form a relatively rigid unitary boxlike structure of relatively great strength completely encasing the externally exposed edges of pallet 10 to prevent damage to the same.

Surfaces 11 and 12 may be secured to spacer beams 13, 14 and 15 in any desired manner as by nails or screws (not shown) but it should be noted that the encasement of the frame work comprised of angle irons 19, 20 and 21 is of sufficient rigidity to obviate the necessity of any other securing means if so desired.

Thus angle irons 19, 20 and 21 may perform the dual functions of reenforcement and retaining or securing means for the surfaces 11 and 12 and spacer beams 13, 14 and 15.

Spaced inwardly from each end of the lower face of pallet 10 is an aperture 22 which extends transversely of the pallet; that is, transversely of the direction of movement of the truck frame into and out of the space between the upper and lower pallet faces. Such an aperture may extend the full width of the pallet and may be reenforced as by angle irons 23 extending along the edges thereof.

Apertures 22 are positioned so that their relatively inner edges are at a desired distance from the relatively inner end edges of the pallet in order that they may accommodate the wheels or analagous supporting mechanism adjacent the end of the pallet lift truck of the type disclosed in applicants' co-pending application. Such a lift truck is generally indicated in Figure 3 by the reference character 25. The truck is fully described in the above mentioned co-pending application of applicants' and a brief description will therefore here suffice.

Preferably the truck comprises an extending frame 26 and a suitable lift mechanism 27 adapted to raise the frame a desired distance by the exertion of pressure in any desired manner upon a wheel 28. The portion of frame 26 extending into the pallet is provided, adjacent its extremities, with supporting members 29 adapted, when the frame is lowered for insertion into the pallet, to be retracted into said frame, and when the frame is raised to be extended therefrom in a downward direction by suitable linkage mechanism (not shown) actuated by lift mechanism 27 to provide an additional support for that end of the lift truck contained within and under the pallet.

Thus it will be seen that as the extending frame 26 is inserted between the upper or load supporting face 11 and the lower face or base 12 of pallet 10 and the lift truck operated, wheels 29 are extended downwardly through the adjacent aperture 22 to engage the floor and provide, in effect, a four wheeled truck. While the pallet hereinbefore described is disclosed with two apertures, it will be understood that any desired number of apertures may be placed therein at desirable distances from the edges to accommodate a plurality of sizes of lift trucks, it being preferable that the total surface area of the lower face of the pallet exceed the apertured portion thereof. When such is the case an adequate supporting surface is provided whereby the pallet may be positioned upon a stack of small articles without disrupting the same.

It will be understood of course that in some instances if desired both the upper and lower surfaces may be provided with apertures if such apertures are of a size less than the dimensions of the article supported on the pallet whereby the the pallet may be used reversibly.

From the foregoing it will now be seen that there is herein provided a unique pallet accomplishing all of the objects of this invention and many others including advantages of great practical utility particularly when the device is utilized in connection with a lift truck of the type disclosed in applicants' co-pending application, Serial No. 164,540, filed of even date herewith.

As many embodiments may be made of this inventive concept and as many modifications may be made in the embodiment herein described and shown in the accompanying drawing, it is to be understood that all matter hereinbefore set forth or shown is to be interpreted merely as illustrative and not in a limiting sense.

We claim as our invention:

1. A device of the character described comprising, in combination, a load suporting surface, a base, spacing means between said first mentioned surface and said base, said base having a relatively large aperture therein, the surface area of said base exceeding the area of said aperture and reenforcing means about the periphery of said aperture, said reenforcing means comprising angle irons secured to the edges of said aperture.

2. A pallet comprising a load supporting surface, a base and spacers between said first mentioned surface and said base, said base having a pair of apertures therein, said apertures being spaced a predetermined distance from the edge of said base.

3. A pallet comprising a load supporting surface, a base and spacers between said first mentioned surface and said base, said base having a pair of apertures therein, said apertures being spaced a predetermined distance from the edge of said base, and reenforcing means about the peripheries of said supporting surface, said base and said apertures.

4. A pallet comprising a load supporting surface, a base and spacers between said first mentioned surface and said base, said base having apertures therein, said apertures extending the entire width of said pallet and being spaced a predetermined distance from the edge thereof.

5. A pallet comprising a load-supporting surface, a base, and spacers between said surface and said base, said base having an aperture therein, one defining edge of which is spaced a predetermined distance from the related pallet end-edge.

6. A pallet comprising a load-supporting surface, a base, and longitudinally extending spacers between said surface and said base, said base having therein an aperture which extends transversely of the pallet and having one defining edge which is spaced a predetermined distance from the related pallet end-edge, one of said spacers being disposed substantially on the longitudinal center line of the pallet to intersect said transversely disposed aperture.

GEORGE G. RAYMOND.
WILLIAM C. HOUSE.